US008638300B2

(12) United States Patent
Silberman et al.

(10) Patent No.: US 8,638,300 B2
(45) Date of Patent: Jan. 28, 2014

(54) METHOD AND TOUCH-SENSITIVE APPARATUS FOR SEARCHING ENTRIES IN A STORED LIST

(75) Inventors: Gabriel Silberman, Fair Lawn, NJ (US); Benjamin Duck, Johnsburg, IL (US); Rindala Saliba, West Windsor, NJ (US)

(73) Assignee: Motorola Mobility LLC, Libertyville, IL (US)

( * ) Notice: Subject to any disclaimer, the term of this patent is extended or adjusted under 35 U.S.C. 154(b) by 1047 days.

(21) Appl. No.: 12/342,776

(22) Filed: Dec. 23, 2008

(65) Prior Publication Data

US 2010/0156815 A1 Jun. 24, 2010

(51) Int. Cl.
*G06F 3/041* (2006.01)

(52) U.S. Cl.
USPC .......................................... 345/173

(58) Field of Classification Search
None
See application file for complete search history.

(56) References Cited

U.S. PATENT DOCUMENTS

| 6,271,835 | B1 * | 8/2001 | Hoeksma | 345/168 |
| 6,847,311 | B2 | 1/2005 | Li | |
| 7,133,859 | B1 * | 11/2006 | Wong | 1/1 |
| 7,202,853 | B2 | 4/2007 | Ng et al. | |
| 7,230,607 | B2 * | 6/2007 | Ono | 345/172 |
| 2010/0164879 | A1 * | 7/2010 | Doktorova et al. | 345/173 |

OTHER PUBLICATIONS

Campos, Andrew et al., "Design and Evaluation of a Spoken-Feedback Keyboard", *Department of Information Systems and Computer Science, INESC-ID/IST/Universidade Technic de Lisboa, R. Alves Redol*, 9, 1000-029 Lisboa, Portugal, (2004), 19-24.

* cited by examiner

*Primary Examiner* — K. Wong

(57) ABSTRACT

A method (300) in an electronic device (100) having a touch sensitive display (102) for searching entries in a stored list includes presenting (302) a reference character set as reference character ranges on an A by B matrix (103) of touch sensitive keys (120,121,122,123,124,125). Upon actuating a touch sensitive key having a reference character range presented thereon, the touch sensitive keys (120,121,122,123, 124,125) are reconfigured to present (306) a secondary reference character set having alphanumeric characters within the reference character range presented on the touch sensitive key prior to actuation. Upon actuating a touch sensitive key having an alphanumeric character presented thereon, the alphanumeric character is added (308) to a search string indicator (111). Soft keys (104,105) and a soft key identification line (106) may be used in conjunction with the A by B matrix (103).

19 Claims, 8 Drawing Sheets

METHOD AND TOUCH-SENSITIVE APPARATUS FOR SEARCHING ENTRIES IN A STORED LIST

BACKGROUND

1. Technical Field

This invention relates generally to searching for entries in a list stored in an electronic device, and more particularly to a method and system for searching for entries in a communication device having a touch sensitive display by way of an A by B matrix keypad.

2. Background Art

Portable wireless communication devices, such as mobile telephones, generally include only a few keys for entering information and for sorting through stored information. For instance, most mobile telephones have a standard twelve-digit keypad that includes the numbers one through nine and zero, as well as a star key and a pound key. Where these mobile telephones are capable of alphanumeric communication, such as sending and receiving SMS text messages for example, alphanumeric data entry can be slow.

By way of illustration, a user may enter the character "a" by hitting the "2-key" once, while hitting the 2-key twice enters a "b," and so forth. Where the user wants to enter the word "act" for example, the user hits the 2-key once to enter the "a" and waits for the cursor on a display to transition to the next character. The user then hits the 2-key three times to enter the "c." The user then hits the 8-key once to enter the "t."

At the same time, many users of mobile telephones today have the telephone numbers of friends and family stored in a contact list or address book. It is not uncommon for a person to never memorize a friend's telephone number, as it is stored in the person's mobile telephone, which the person carries with them constantly. The problem arises when many numbers are stored in a communication device. Where such a device is configured with a standard keypad, searching for a particular contact can be more time consuming that simply typing the number due to the slow data entry noted above.

One solution to this issue is to provide mobile devices with full QWERTY keypads. The problem with this solution is that the overall device increases dramatically in size. To accommodate a QWERTY keypad, the device may need to be fifty to seventy-five percent larger (or more) than the device would be with a standard telephone keypad. Consumers often demand devices with small form factors. As such, this option is less than desirable.

Another solution is to provide a "virtual" QWERTY keypad via a touch sensitive display. The problem with this solution is that high-resolution multi-pixel displays are expensive, as are the high granularity sensors that are used to detect a user's touch. Consequently, consumers shopping for moderately priced communication devices may not be willing to pay to add this feature.

There is thus a need for an improved method and apparatus for searching and entering alphanumeric data in portable communication devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to searching and entering data by way of a compact, matrix-based touch sensitive user interface in a mobile device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of searching or entering data as described herein. The non-processor circuits may include, but are not limited to, a radio receiver, a radio transmitter, signal drivers, clock circuits, power source circuits, and user input devices. As such, these functions may be interpreted as steps of a method to perform the searching of data as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method for entering or searching data in a wireless communication device. The method can be used with a wireless communication device having a touch sensitive user interface, such as a touch sensitive display. However, embodiments of the present invention employ only an A by B, or an "A.times.B," matrix of touch sensitive keys, such as a three by two matrix of six touch sensitive keys. Consequently, embodiments of the present invention can be manufactured with less expensive touch sensitive displays in a more compact form factor than can devices having full QWERTY keypad touch sensitive displays. For instance, a small, low-resolution touch sensitive display having low-granularity touch sensors can be used to enter alphanumeric text or search through a contact list without the need for expensive touch-sensitive display components. Further, the device surface area required for such a low-resolution display can be as much as fifty percent less than is required for a high-resolution display. Embodiments of the invention provide a more efficient method of entering text or searching for entries than when using a standard telephone keypad.

In one embodiment of the invention, alphanumeric reference characters are presented to a user in ranges on a three by two matrix of touch sensitive keys. For instance, a first range may include the letters A-F, while a second range includes the letters G-L, and so forth. When a user touches the key having A-F presented thereon, the three by two matrix of touch sensitive keys presents the alphanumeric characters of that range, such as A on a first key, B on a second key, and so forth. By touching the appropriate key, the character displayed thereon can be entered into a search string indicator. In one embodiment, once a character is entered into the search string indicator, the original ranges are then again presented on the matrix of keys to facilitate entry of a second alphanumeric character into the search string indicator.

In one embodiment, when a key having a primary range, such as A-F for example, is actuated by a user, only characters within that range corresponding to entries in the stored list are presented. To illustrate by example, consider an address book application in a mobile telephone.

Once the user touches the A-F key, in one embodiment the letters A through F would then be presented on a three by two matrix of touch sensitive keys. However, if the address book contains only the entries Allen, Betty, Doug, Frank, Harold, Milton, Otewengo, William, and Yulee, in one embodiment only the characters A, B, D, and F would be displayed on the three by two matrix of touch sensitive keys because there are no entries beginning with the letters C and E. Using such an embodiment of the invention, searching efficiency can be increased even further.

Figure 1:
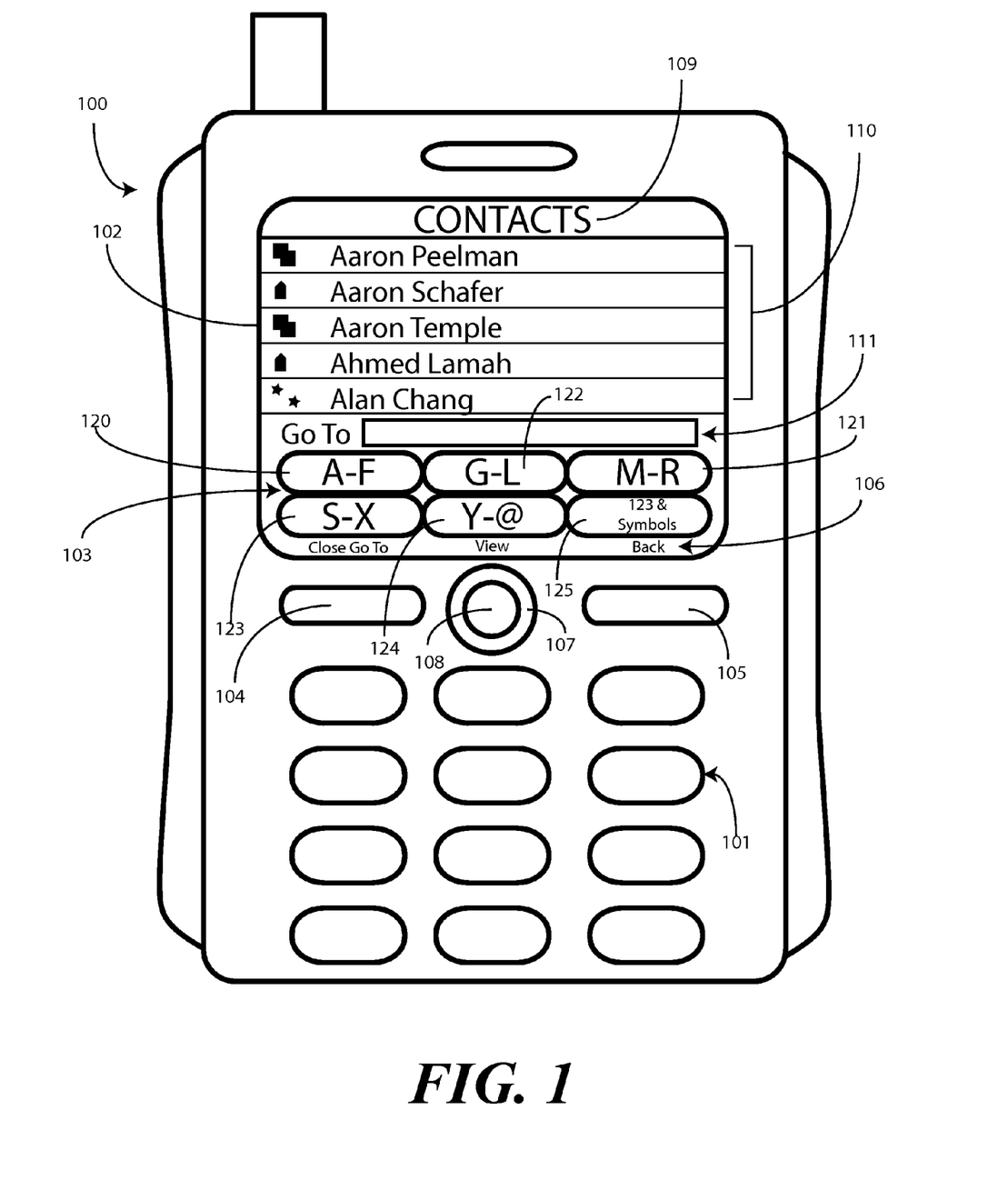
FIG. 1 illustrates one wireless communication device in accordance with embodiments of the invention.

Turning now to FIG. 1, illustrated therein is one embodiment of a wireless communication device 100 in accordance with embodiments of the invention. For ease of discussion, the wireless communication device 100 described herein will be that of a mobile telephone. However, it will be obvious to those of ordinary skill in the art having the benefit of this disclosure that the invention is not so limited. Embodiments of the invention may be applied to other devices, such as gaming devices, multimedia players, cameras, and the like.

The wireless communication device 100 includes a touch sensitive display 102 capable of presenting an A by B matrix 103 of touch sensitive keys 120,121,122,123,124,125 to a user. In one embodiment, the touch sensitive display 102 is configured to present a three by two matrix of touch sensitive keys 120,121,122,123,124,125. As only six keys are presented to the user in this embodiment, the touch sensitive display 102 can be one of lower resolution having just a few discrete touch sensors to save costs. Additionally, as only six keys are presented, the overall display can be smaller than in other applications where twenty-eight, thirty, or more keys are presented. The use of a small matrix, such as a three by two matrix, can be particularly useful with devices having limited keypads, or reduced entry keypads, on smaller devices having limited data entry capability such as mobile telephones that can be used to send SMS, EMS, or MMS messages.

The wireless communication device includes a standard keypad 101 for entering some data. In one embodiment, this keypad 101 includes a standard 12-key telephone pad, and does not include a full QWERTY keypad. In addition to the keypad 101, soft keys 104,105 may be included. These soft keys 104,105 have functions that change with the application then operating on the wireless communication device 100. The function associated with each soft key 104,105 may be presented to a user in the soft key identification line 106. A navigation key 107 may be included for navigating through the various applications of the device. Further, the navigation key 107 may include a third soft key 108 for making function selections as well.

As will be described with FIG. 2, in one embodiment, the wireless communication device 100 includes a contact list application 109 operable within the wireless communication device 100. When operating, the contact list application 109 is configured to present contacts 110 from a stored list to a user on the display. These contacts 110 may be displayed, for instance, alphabetically. The user may employ the navigation key 107 to scroll through the contact list. When searching for a particular contact, alphanumeric characters entered for the search can be displayed in a search string indicator 111.

Figure 2:
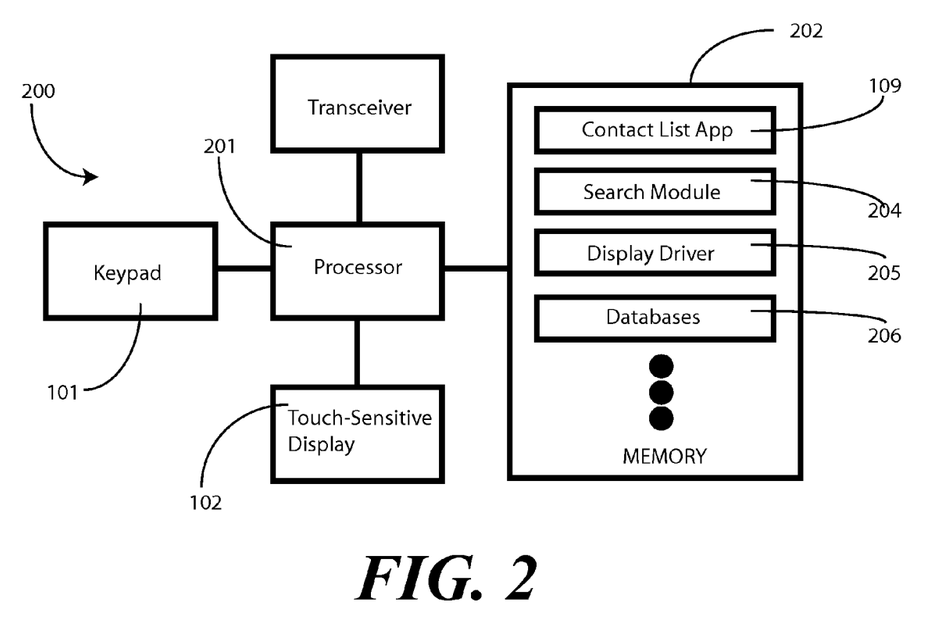
FIG. 2 illustrates a block diagram of the internal circuitry and software or firmware modules of wireless communication device in accordance with embodiments of the invention.

Turning now to FIG. 2, illustrated therein is a block diagram 200 of the internal circuitry and software or firmware modules of the wireless communication device (100). While this internal circuitry is directed to a mobile telephone application for illustration, it will be clear to those of ordinary skill in the art having the benefit of this disclosure that embodiments of the invention are not so limited. Methods and devices described herein can equally be applied to conventional telephones, personal digital assistants, facsimile machines, pagers, electronic label makers, or other electronic devices with reduced keypads, which have fewer keys than alphabet symbols.

The keypad 101 and touch sensitive display 102 are coupled to a control device, such as processor 201. The processor 201 is configured to operate the various functions of the wireless communication device (100) and to execute software or firmware applications stored in memory 202. The processor 201 executes this software or firmware to provide device functionality. As will be described below, in some embodiments this software or firmware can include a contact list application 109, a search module 204, driver firmware 205 for the touch sensitive display, and other applications, such as database 206.

The contact list application 109 is configured to store contact entries as an electronic address book. While the contact list application 109 is used herein as an exemplary embodiment, it will be clear to those of ordinary skill in the art having the benefit of this disclosure that the invention is not so limited. For instance, in one embodiment, the search module 204 is operable within the contact list application 109 to search for a specific contact entry. However, the search module 204 could be used with other database applications that employ stored lists of entries, including multimedia applications that have lists of songs, pictures, or movies, gaming applications that use lists of game titles, notepad applications with lists of notes, Internet browsing applications that have lists of favorite links, and so forth. In any of these applications, the search module 204 can be configured to present partitioned alphanumeric character ranges corresponding to alphanumeric reference characters in the entry titles of the stored list on a matrix of touch sensitive keys to facilitate efficient searching of the stored list. When a user actuates a touch sensitive key having one of the partitioned alphanumeric ranges presented thereon, the search module 204 would then be configured to present the characters corresponding to the range on the same matrix of touch sensitive keys. To show the user which character had been selected, the search module 204 can be configured to present the character corresponding to the selected touch sensitive key in a search string indicator (111) of the contact list application 109.

Figure 3:
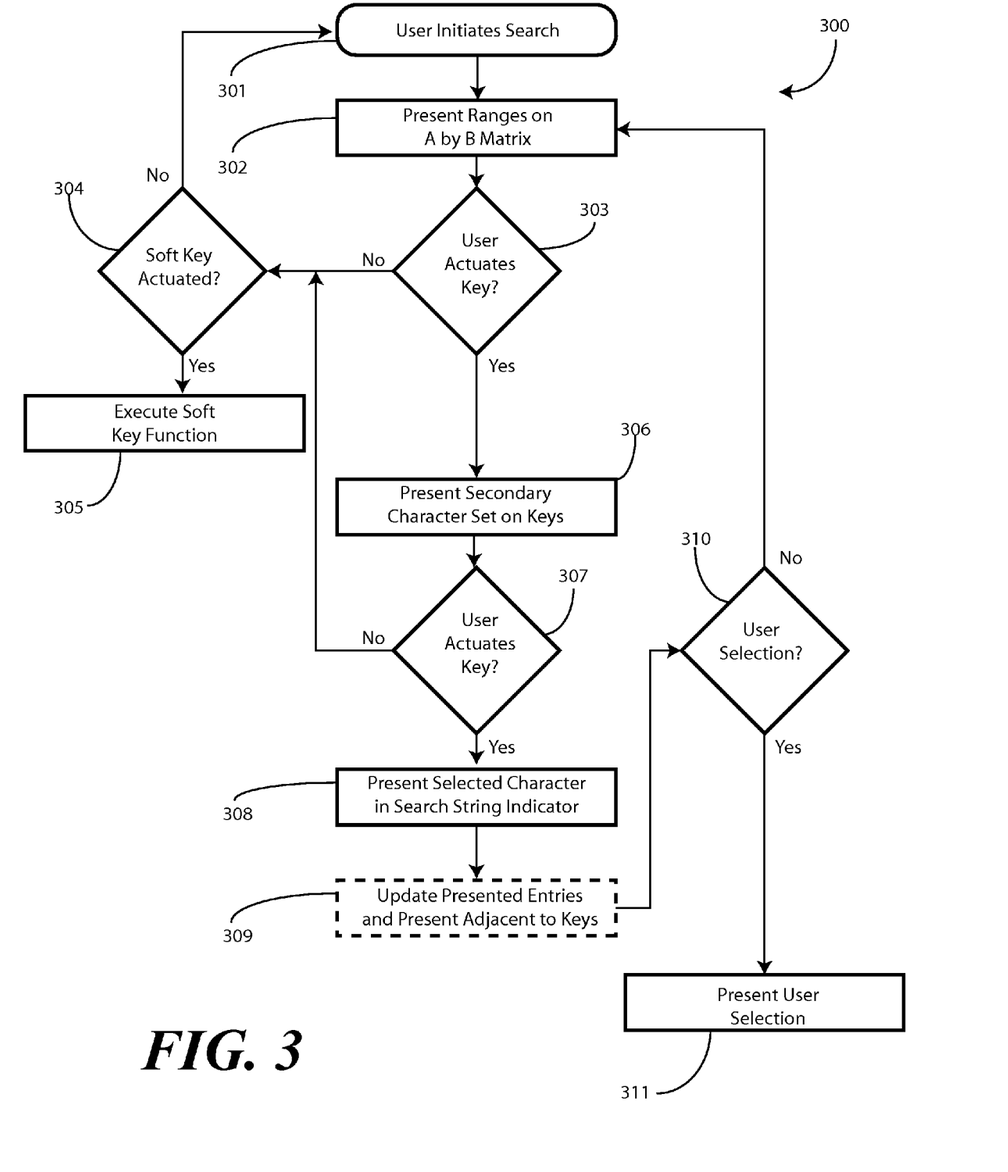
FIG. 3 illustrates one method, suitable for use in a wireless communication device, for searching entries in a stored list in accordance with embodiments of the invention.

Turning now to FIG. 3, illustrated therein is a method 300 suitable for use in a wireless communication device (100) for searching entries in a stored list, such as a list of contacts in a contact list application (109) or the entries in a file list. At step 301, a user actuates a search, perhaps by actuating one of the soft keys (104,105) having a "search" indicator corresponding thereto in the soft key identification line (106). The processor (201), for example, receives this search actuation upon user actuation of an appropriate soft key (104,105).

Upon receiving the search actuation, a reference character set for the stored list is presented as character ranges on an A by B matrix (103) of touch sensitive keys (120,121,122,123, 124,125) at step 302. For instance, where the A by B matrix (103) is a three by two matrix, the character ranges may be as follows: A first range presented as "A-F" on a first touch sensitive key (120) of the three by two matrix; a second range presented as "G-L" on a second touch sensitive key (121) of the three by two matrix; a third range presented as "M-R" on a third touch sensitive key (122) of the three by two matrix; a fourth range presented as "S-X" on a fourth touch sensitive key (123) of the three by two matrix; a fifth range presented as "Y-@" on a fifth touch sensitive key (124) of the three by two matrix; and a sixth range presented as "123 & Symbols" on a sixth touch sensitive key (125) of the three by two matrix.

Note that while these are illustrative ranges for a three by two matrix, other ranges can be used as well. For instance, other ranges may apply where the A by B matrix (103) is a three by three matrix. Regardless of matrix size, in one embodiment the number of ranges is less than or equal to A times B so that each range can be presented on a different key of the matrix. In the illustrative embodiment of a three by two matrix, A times B is six, so six or fewer ranges are displayed in the matrix.

At decision 303, user actuation of one of the touch sensitive keys (120,121,122,123,124,125) in the A by B matrix (103) is monitored. At decision 304, detection of one of the soft keys (104,105) is monitored. Where neither a touch sensitive key (120,121,122,123,124,125) of the A by B matrix (103) nor a soft key (104,105) is actuated, the reference character set continues to be presented on the touch sensitive keys (120, 121,122,123,124,125) of the A by B matrix (103) at step 302. Where a touch sensitive key (120,121,122,123,124,125) is not actuated, but a soft key (104,105) is actuated, as detected at decision 304, the corresponding function of the soft key (104,105) set forth in the soft key identification line (106) is actuated at step 305.

Examples of soft key functions executed at step 305 can vary. For example in one embodiment, a soft key can be configured as a CLR key, which when actuated clears any characters present in the search string indicator (111). In one embodiment, a soft key can be configured as an END key, which when actuated closes the contact list application (109) and returns the touch sensitive display (102) to an idle state. In one embodiment, a soft key can be configured as a SEND key, which when actuated causes a highlighted entry of the stored list to be acted upon, such as placing a telephone call to that entry or sending a SMS message to that entry.

Where a touch sensitive key (120,121,122,123,124,125) is actuated, as detected at decision 303, a secondary reference character set is presented on the A by B matrix (103) of touch sensitive keys (120,121,122,123,124,125) at step 306. Each character of the secondary reference character set is within a reference character range that was presented on the touch sensitive key (120,121,122,123,124,125) that was detected as being actuated at decision 303.

For example, if a touch sensitive key (120) having reference character range "A-F" presented thereon was detected as being actuated by a user at decision 303, the secondary character set may include the characters A, B, C, D, E, and F, with each character being presented on a different key of the A by B matrix (103) at step 306. Where a touch sensitive key (122) having reference character range "M-R" presented thereon was actuated, the secondary character set may include the characters M, N, O, P, Q, and R, with each character being presented on a different key of the A by B matrix (103) at step 306.

Now that the secondary reference character set is presented, decision 307 monitors for actuation of one of the touch sensitive keys (120,121,122,123,124,125). Note that in one embodiment, the user may return to the reference character ranges presented at step 302, or exit from the search module (204) by actuating one of the soft keys (104,105). Actuation of one of the touch sensitive keys (120,121,122, 123,124,125) is detected at decision 307. Upon actuation, in one embodiment, the reference character that was presented on the actuated key can be presented in the search string indicator (111) at step 308.

In one embodiment, some entries of the stored list can be displayed adjacent to the A by B matrix (103) as was shown in FIG. 1. When search information has been entered into the search string indicator (111) as described in the preceding paragraphs, the entries presented may be limited to those corresponding to the alphanumeric character entered in the search string indicator (111). For example, if the letter "A" is entered into the search string indicator (111), in one embodiment only entries from the stored list beginning with that reference character will be shown on the touch sensitive display (102). In an alternate embodiment, the list of entries will simply scroll to, or "jump," to the entries beginning with the letter "A." To accommodate this, at optional step 309, the list is updated so that entries beginning or otherwise corresponding to the reference character displayed in the search string indicator (111) are presented on the touch sensitive display (102) adjacent to the A by B matrix (103) of touch sensitive keys (120,121,122,123,124,125).

In one embodiment, step 309 provides for fewer entries being displayed as reference characters are added to the search string indicator (111) as fewer entries will correspond with the longer search string. This reduction in entries will continue as reference characters are added until a user selection of one of the entries is detected at decision 309. Where this occurs, the user selection is presented on the touch sensitive display (102) at step 311.

In another embodiment, step 309 simply scrolls or "jumps" to those entries beginning with the corresponding letter. As such, the entire list can still be presented, however, only portions corresponding to selected letters are present on the display.

Where no user selection is detected at decision 309, and where no soft key (104,105) is actuated to exit the search module (204) as detected at decision 304, the process will repeat such that additional reference characters can be added to the search string indicator (111) by returning to step 302. Said differently, the reference character set will again be presented at step 302 on different keys of the A by B matrix (103). Additional actuations of keys of the A by B matrix will be detected at decision 303, and additional secondary reference character sets will be presented on the touch sensitive keys (120,121,122,123,124,125) of the A by B matrix (103) at step 306 for entry into the search string indicator (111) at step 308 until a user selection of an entry is detected at decision 310. At that time, the user selection will be presented on the touch sensitive display (102) at step 311.

Figure 4:
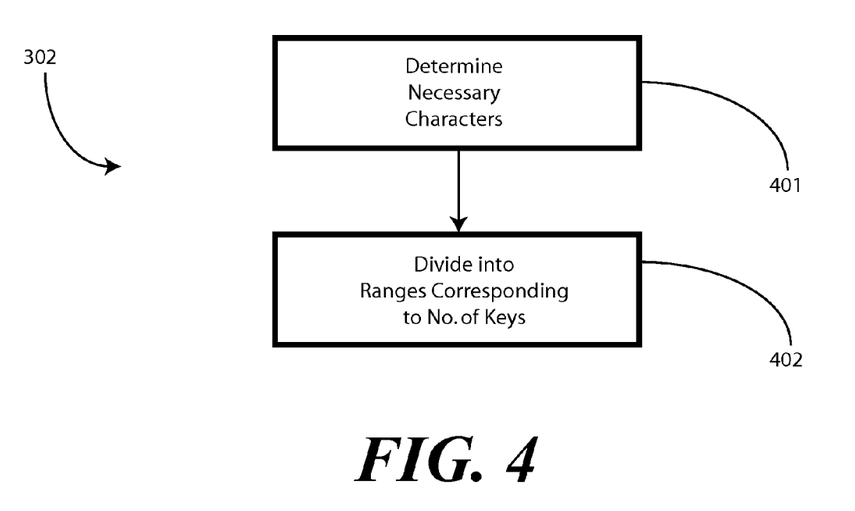
FIG. 4 illustrates one method of presenting reference character ranges in accordance with embodiments of the invention.

In the paragraphs above, the reference character ranges of A-F, G-L, M-R, S-X, Y-@, and 123 & Symbols provided options for all alphanumeric characters available on a QWERTY keyboard in a three by two matrix of touch sensitive keys (120,121,122,123,124,125). Note however, that it may be more efficient to present only those characters that correspond to at least one entry of the stored list, and omitting reference characters not corresponding to at least one entry of the stored list. For example, in a contact list, if there are no entries beginning with the letter "F," the first reference character range may be presented as "A-E" rather than "A-F" for efficiency purposes. Turning now to FIG. 4, illustrated therein is one method for accomplishing this.

FIG. 4 illustrates one method of presenting the reference character ranges (step 302 of FIG. 3) in accordance with embodiments of the invention. At step 401, the necessary characters for presentation as reference character ranges are determined. This may be done, for example, by determining all the primary reference characters of the stored list. Where no entries begin with F, G, or X, the set of primary reference characters may omit these alphanumeric characters.

At step 402, the number of reference characters corresponding to entries in the stored list is divided by A times B so that the number of ranges will be less than or equal to A times B. In so doing, it is assured that each range can be presented on a different touch sensitive key (120,121,122,123,124,125) of the A times B matrix (103), with only those characters corresponding to entries of stored list being presented.

Figure 5:
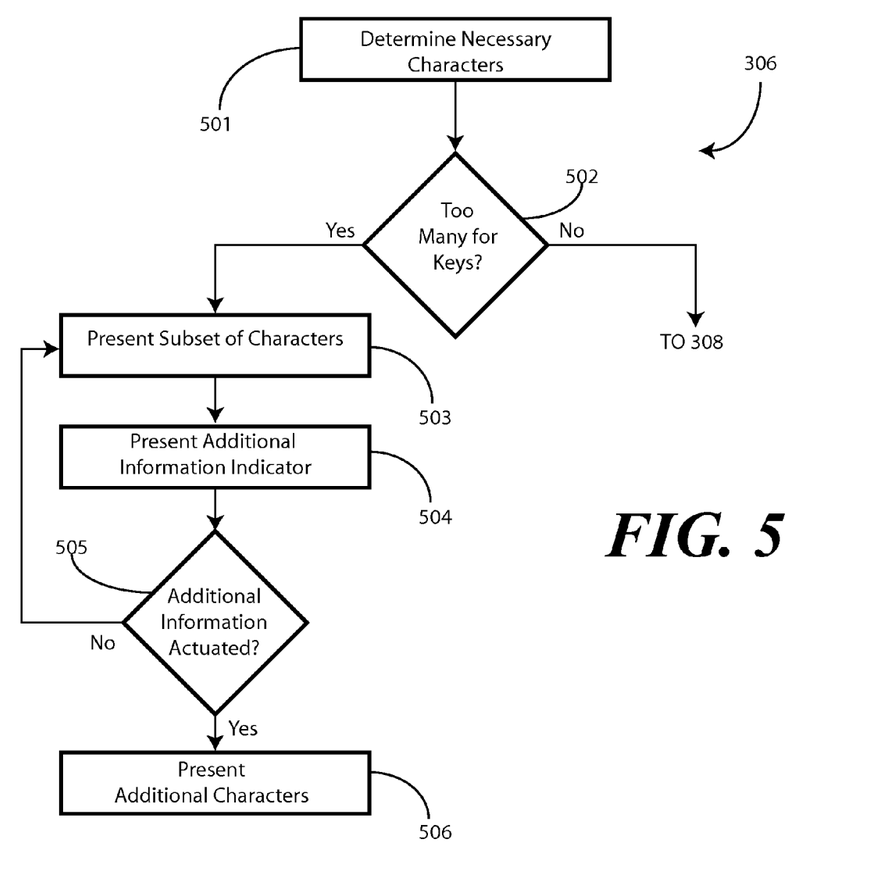
FIG. 5 illustrates one method of ensuring that only characters corresponding to entries in the stored list are presented in accordance with embodiments of the invention.

This process can also be performed on the secondary reference character set. Turning now to FIG. 5, illustrated therein is one method of accomplishing step 306 of FIG. 3 to ensure that only characters corresponding to entries in the stored list are presented.

At step 501, the necessary reference characters are determined from the entries of the list as explained above. Where the entries are Allen, Betty, Doug, Frank, Harold, Milton, Otewengo, William, and Yulee, the primary character set displayed (step 302) on touch sensitive key (120) may still be A-F. However, as determined at step 501, the secondary reference character set may only include the letters A, B, D, and F. These characters would be displayed on the touch sensitive keys (120,121,122,123,124,125) of the A by B matrix (103) at step 308 of FIG. 3. Where the A by B matrix (103) is a three by two matrix, only four of the six touch sensitive keys may be used. The others may be left blank.

In some situations, there will be more characters that correspond to a particular reference character range than can be presented on a single presentation of the A by B matrix (103). Such would be the case where the A by B matrix (103) was a two by two matrix. Similarly, such may be the case where the A by B matrix (103) is a three by two matrix and a user actuates the "123 & Symbols" touch sensitive key. This "oversupply" of characters is detected at decision 502.

Upon determination that the secondary reference character set comprises more than A times B characters, a subset of the secondary reference character set is presented on a subset of the A by B matrix (103) of touch sensitive keys (120,121,122, 123,124,125) at step 503. For example, where the A by B matrix (103) is a three by two matrix and the secondary reference character set includes twelve characters, five characters from the secondary reference character set may be presented on five of the touch sensitive keys. At step 504, an indicator of additional character availability is presented on at least one key of the A by B matrix (103). This may read "additional characters" or provide another announcement to that effect.

Where a user desires a character other than those displayed at step 503, the user actuates the additional information key, which is detected at decision 505. Additional characters, such as the next five characters of the secondary reference character set, are presented at step 506. This can continue until the all characters of the secondary reference character set have been presented. Note that soft keys (104,105) may be configured to scroll back through the characters presented, or to exit the search module (204), or to return to the reference character ranges (step 302).

Figure 6:
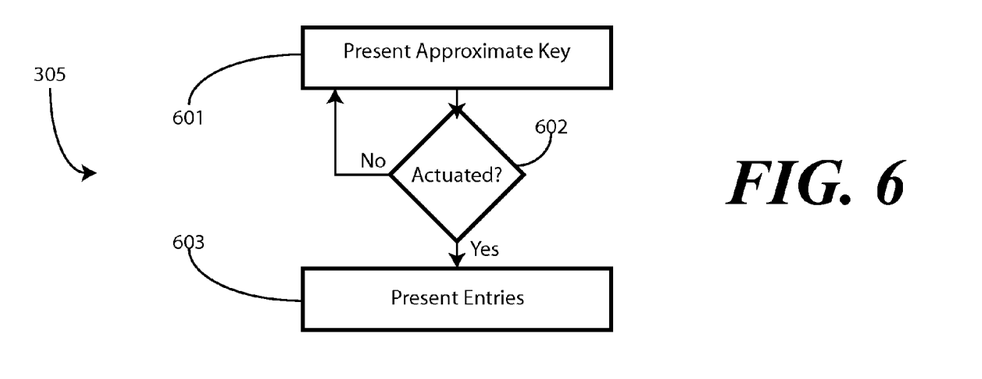
FIG. 6 illustrates a method depicting how a CLOSE-GO-TO soft key may be used in accordance with embodiments of the invention.
Figure 7:
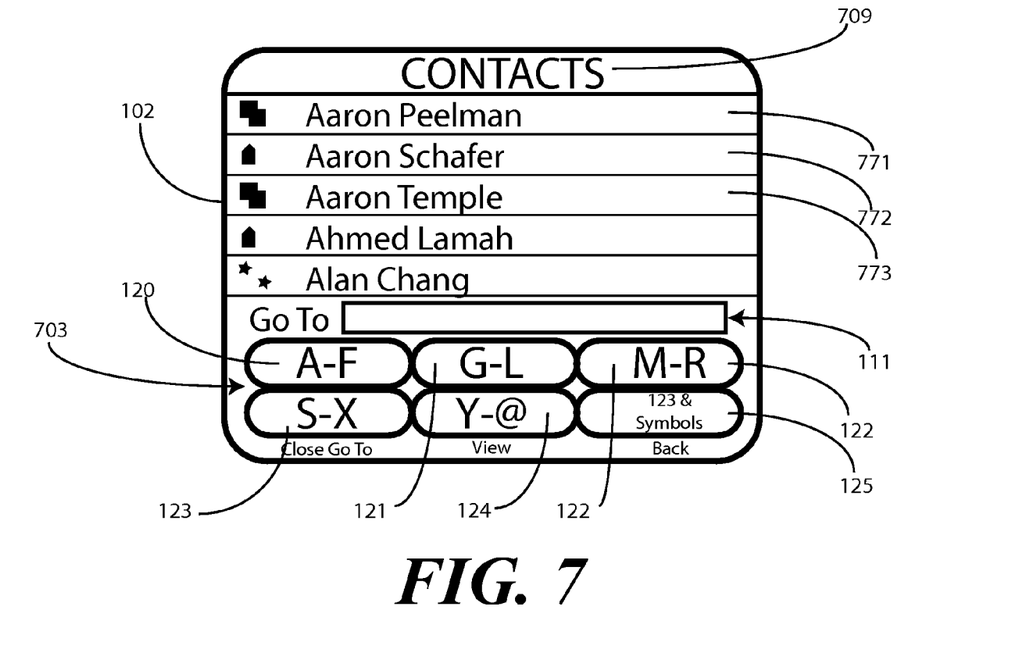
FIGS. 7-13 illustrate screen shots associated with use cases as described herein in accordance with embodiments of the invention.

In one embodiment, one of the soft keys (104,105) can be configured as an approximation key. For example, the soft key identification line (106) may state that the corresponding soft key (104,105) is configured as a "Close—GOTO" key. Turning now to FIG. 6, illustrated therein is a method depicting how such as soft key may be used.

At step 601, the approximation key is presented adjacent to the A by B matrix (103) of touch sensitive keys (120,121,122, 123,124,125). One way of doing this is by configuring one of the soft keys (104,105) as the approximation key. User actuation of the approximation key is detected at decision 602. Where the user actuates the approximation key, at step 603 the entries corresponding to alphanumeric characters presented in the search string indicator (111) are presented on the touch sensitive display (102). The A by B matrix (103) of touch sensitive keys (120,121,122,123,124,125) can optionally be removed at this step. The approximation key allows a user to immediately jump from the search module (204) to close entries in the stored list at the touch of a button.

Turning now to FIGS. 7-13, illustrated therein are enlarged views of a touch sensitive display (102) for an electronic device employing embodiments of the invention to graphically illustrate an illustrative operation of the device. Beginning with FIG. 7, a three by two matrix 703 of touch sensitive keys 120,121,122,123,124,125 is presented on the touch sensitive display 102. An address book application 709 is running on the device, and a search module (204) is operating within the address book application (709). Entries 771,772,773 from a stored list associated with the address book application 709 are presented adjacent to the three by two matrix 703. A search string indicator 111 is presented between the entries 771,772,773 and the three by two matrix 703.

A reference character set corresponding to the stored list is presented as reference character ranges on the touch sensitive keys 120,121,122,123,124,125. In the illustrative embodiment of FIG. 7, reference character range A-F is presented on touch sensitive key 120, reference character range G-L is presented on touch sensitive key 121, reference character range M-R is presented on touch sensitive key 122, reference character range S-X is presented on touch sensitive key 123, reference character range Y-@ is presented on touch sensitive key 124, and reference character range 123 & SYMBOLS is presented on touch sensitive key 125.

Figure 8:
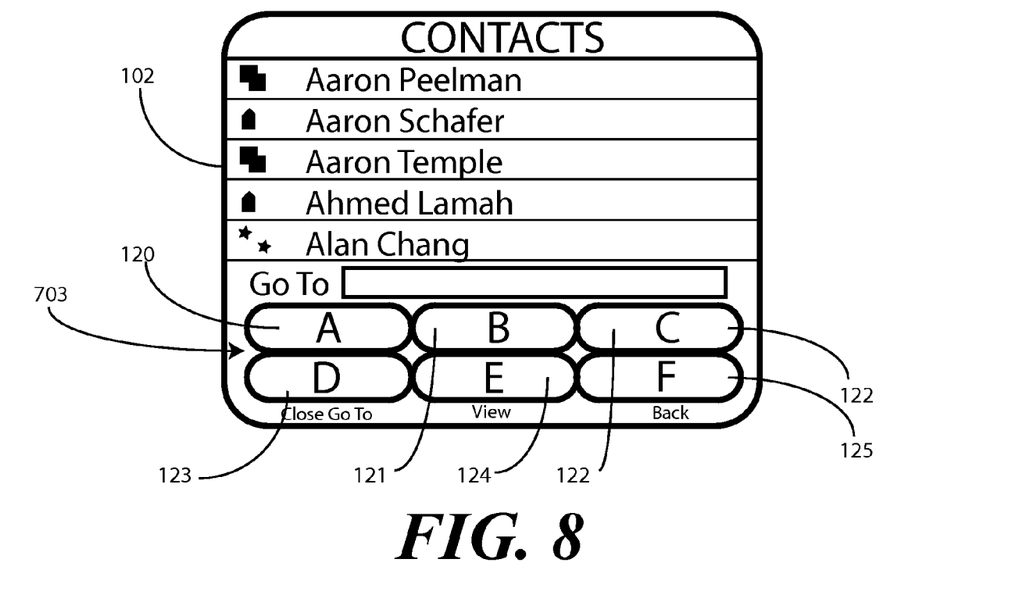

Once a user actuates, for example, touch sensitive key 120, the touch sensitive display 102 changes to that shown in FIG. 8. In FIG. 8, a secondary reference character set is presented on the three by two matrix 703 of touch sensitive keys 120, 121,122,123,124,125. Each character of the secondary reference character set is within the reference character range that was presented on the touch sensitive key (120) prior to actuation. Here, the reference character set includes the characters A, B, C, D, E, and F. Character A is presented on touch sensitive key 120, character B is presented on touch sensitive key 121, character C is presented on touch sensitive key 122, character D is presented on touch sensitive key 123, character E is presented on touch sensitive key 124, and character F is presented on touch sensitive key 125.

Figure 9:
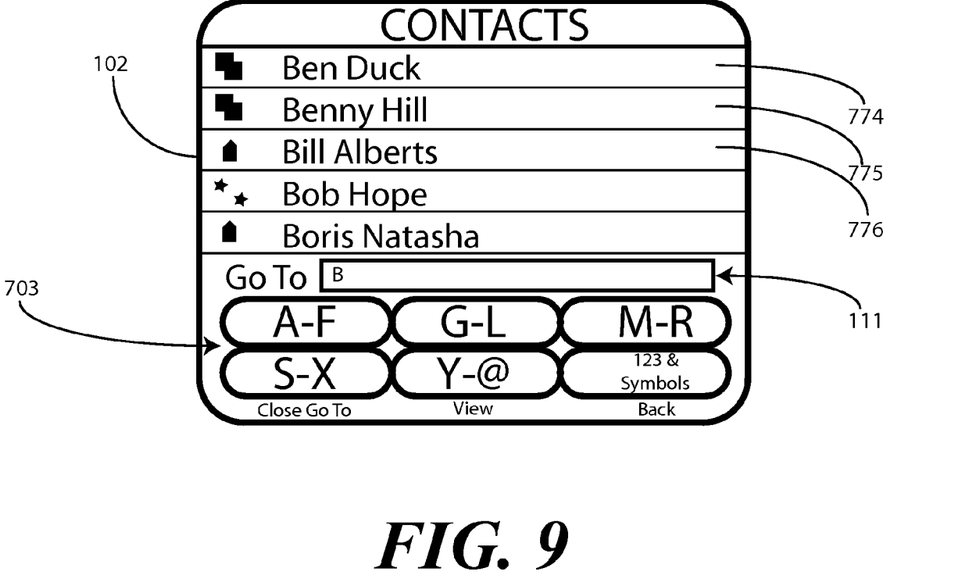

Once a user actuates, for example, touch sensitive key 121, the touch sensitive display 102 changes to that shown in FIG. 9. In FIG. 9, the reference character presented on the touch sensitive key (121) prior to actuation (i.e., character B) is presented in the search string indicator 111. In one embodiment, at least some entries 774,775,776 of the stored list are presented adjacent to the three by two matrix 703. In the illustrative embodiment of FIG. 9, the entries 774,775,776 begin with the reference character presented in the search string indicator 111. As more and more characters are added to the search string indicator 111, fewer and fewer entries will be presented on the touch sensitive display 102. Alternatively, the same number of entries may be presented, with the presentation simply jumping to matching entries for presentation on the display. Note that as a character has been added to the search string indicator 111, the three by two matrix 703 has reverted to presenting the reference character ranges so the process can repeat.

Figure 10:
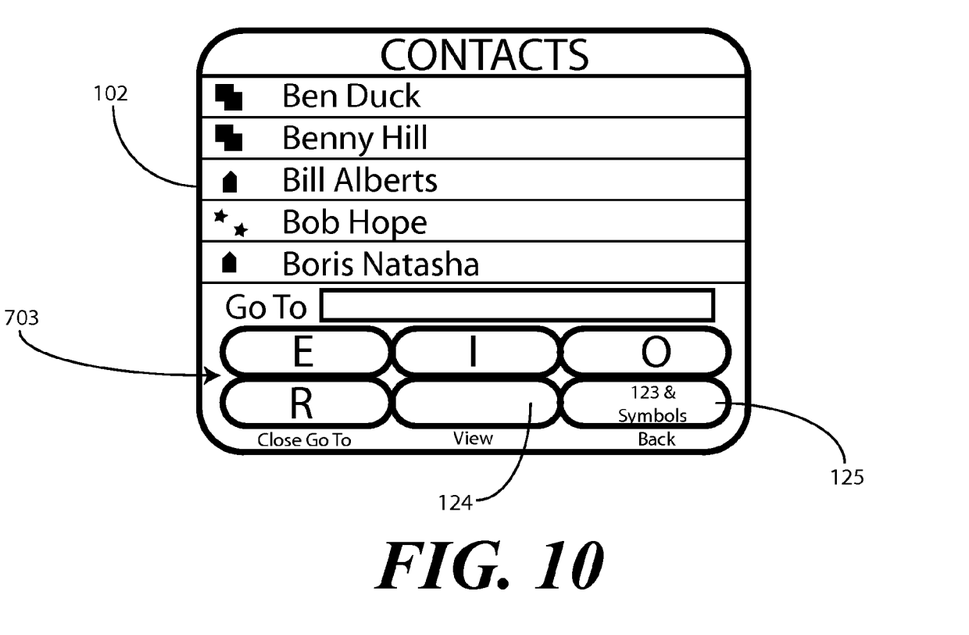

Turning now to FIG. 10, illustrated therein is a touch sensitive display 102 presentation where the secondary reference character set has fewer characters to display than the number of keys in the three by two matrix 703. In such a scenario, some keys—like touch sensitive key 124—may be left blank. Further, other keys—like touch sensitive key 125—may present indicators of additional information.

Figure 11:
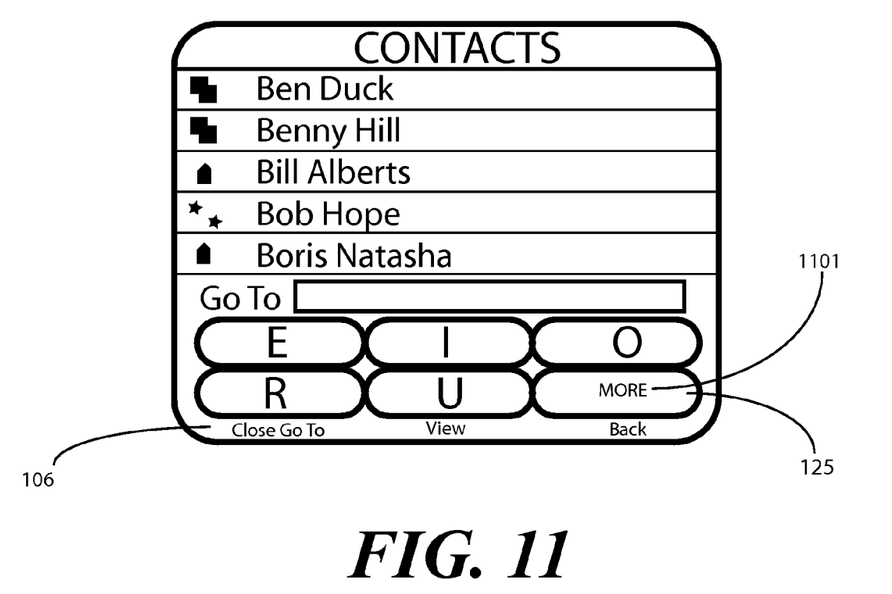

Turning now to FIG. 11, the opposite case is presented. In FIG. 11, there are more characters to be presented that there are touch sensitive keys. As such, an indicator of additional character availability 1101 is presented on touch sensitive key 125. By actuating this key, the user may display additional characters on the touch sensitive keys. Note that one soft key has been configured as a "back" key as indicated in the soft key identification line 106. This soft key facilitates scrolling through the various presentations of secondary reference character set characters.

Figure 12:
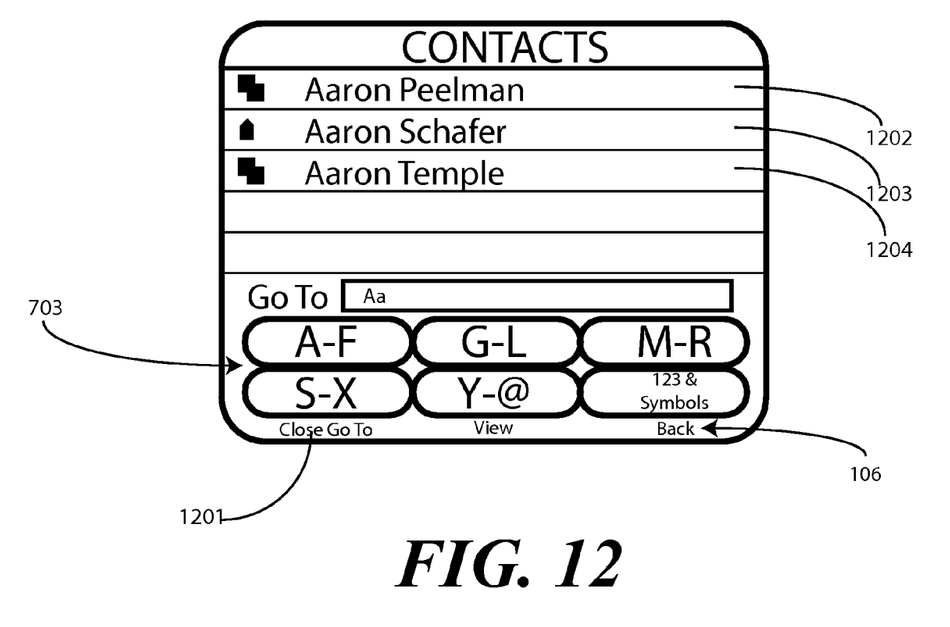
Figure 13:
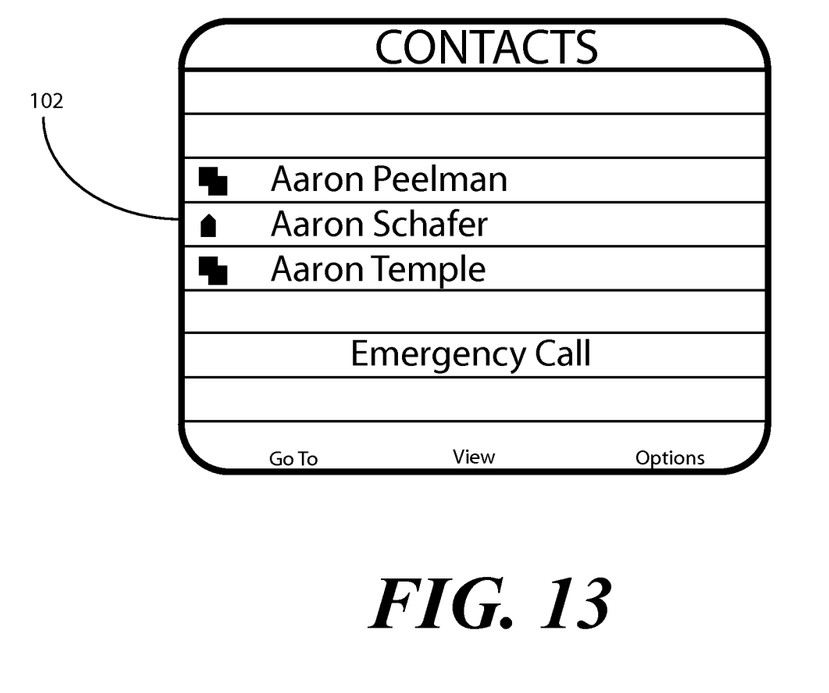

Turning now to FIGS. 11 and 12, illustrated therein is exemplary operation of an approximation key 1201 in accordance with embodiments of the invention. In FIG. 12, characters "Aa" have been entered into the search string indicator 111. One of the soft keys (soft key 104) has been configured as an approximation key 1201, as is evidenced by the "Close GO TO" indicator in the soft key identification line 106. The entries 1202,1203,1204 of the address book application (709) are Aaron Peelman, Aaron Schafer, and Aaron Temple. By actuating the approximation key 1201, the three by two matrix 703 is removed, and all entries corresponding to the characters present in the search string indicator 111 are presented on the touch sensitive display 102, as shown in FIG. 13. The user may then select one of these entries directly through the touch sensitive display 102.

As shown in the figures and as described above, searching a stored list of an electronic device is accomplished by presentation of reference character ranges on an A by B matrix of touch sensitive keys. Pressing a touch sensitive key having a reference character range presented thereon reveals a secondary character set having characters within the selected reference character range on the touch sensitive keys. Actuating a touch sensitive key with a character presented thereon populates the search string indicator with the character and returns the A by B matrix to the reference character sets.

In accordance with one embodiment of the invention, a user can search for an entry in address book application operating in a communication device having a touch sensitive user interface by selecting a touch sensitive key in a three by two (or other size) matrix having an alphanumeric character range presented thereon. Upon actuating the key, the communication device presents alphanumeric characters on the touch sensitive keys, with each of the alphanumeric characters corresponding to the actuated alphanumeric character range. Actuation of a touch sensitive key having an alphanumeric character presented thereon causes the alphanumeric character presented on that touch sensitive key to be presented in a search string indicator.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device having a touch sensitive user interface of searching entries in a stored list, comprising:
   receiving, with one or more processors comprising instructions to implement the method, a search actuation from the touch sensitive user interface; and
   presenting, on the touch sensitive user interface, a reference character set for the stored list as reference character ranges on a matrix of A.times.B touch sensitive keys;
   wherein the reference character ranges are less or equal in number than A.times.B; and
   wherein each reference character range is presented on a different key;
   detecting, with the one or more processors, actuation of one key of the matrix of A.times.B touch sensitive keys; and
   presenting, with the one or more processors, a secondary reference character set on the matrix of A.times.B touch sensitive keys, and omitting presentation of reference characters from the secondary reference character set not corresponding to the at least one entry of the stored list;

wherein each reference character of the secondary reference character set is within a reference character range presented on the one key prior to actuation.

2. The method of claim 1, wherein $A \times B$ is six or fewer.

3. The method of claim 2, wherein the reference character ranges comprise at least A-F, G-L, M-R, S-X, and Y-@.

4. The method of claim 2, wherein the stored list comprises one of a contact list or a file list.

5. The method of claim 1, wherein the each reference character corresponds to at least one entry of the stored list.

6. The method of claim 1, wherein when the secondary reference character set comprises more than $A \times B$ reference characters, further comprising:

presenting a subset of the secondary reference character set on a subset of the matrix of $A \times B$ touch sensitive keys; and presenting an indicator of additional characters on at least one key of the matrix of $A \times B$ touch sensitive keys.

7. The method of claim 1, further comprising:

detecting actuation of a key of the matrix of $A \times B$ touch sensitive keys having a reference character presented thereon; and presenting the reference character in a search string indicator.

8. The method of claim 7, further comprising presenting at least some of the entries of the stored list adjacent to the matrix of $A \times B$ touch sensitive keys, the at least some of the entries of the stored list beginning with the reference character.

9. The method of claim 7, further comprising presenting fewer of the entries of the stored list than the at least some of the entries of the stored list as reference characters are added to the search string indicator.

10. The method of claim 9, wherein the presenting fewer of the entries continues until a user selection of one of the entries is detected, and further comprising presenting the user selection on a display of the electronic device.

11. The method of claim 7, further comprising:

again presenting the reference character set for the stored list as the reference character ranges on different keys of the matrix of $A \times B$ touch sensitive keys.

12. The method of claim 9, further comprising:

detecting additional actuations of keys of the matrix of $A \times B$ touch sensitive keys; and presenting additional secondary reference character sets on the matrix of $A \times B$ touch sensitive keys, wherein each additional reference character of the additional secondary reference character sets is within an additional reference character range presented on the keys of the matrix of $A \times B$ touch sensitive keys prior to actuation.

13. The method of claim 12, further comprising:

presenting additional reference characters in the search string indicator upon actuation of reference character-keys having additional reference characters presented thereon.

14. The method of claim 1, further comprising:

presenting an approximation key adjacent to the matrix of $A \times B$ touch sensitive keys;

detecting actuation of the approximation key; and presenting the entries of the stored list corresponding to alphanumeric characters presented in a search string indicator.

15. A wireless communication device, comprising:

a processor;

a contact list application, operable with the processor, configured to store contacts as entries in a stored list;

a touch sensitive display, operable with the processor, and configured to present a three-by-two matrix of touch sensitive keys on the touch sensitive display; and a search module, operable with the processor and the contact list application to find a contact, and configured to present partitioned alphanumeric character ranges on the touch sensitive keys;

wherein when a user actuates a touch sensitive key, the search module is configured to present only alphanumeric characters both within a partitioned alphanumeric character range presented on the touch sensitive key prior to actuation by the user and corresponding to entries in the stored list along the three-by-two matrix of touch sensitive keys.

16. The wireless communication device of claim 15, wherein when a user additionally actuates an additional touch sensitive key, the search module is configured to present an alphanumeric character corresponding to the additional touch sensitive key in a search string of the contact list application.

17. The wireless communication device of claim 16, wherein the partitioned alphanumeric character ranges comprise A-F, G-L, M-R, S-X, Y-@, and 123.

18. In address book application operating in a communication device having a touch sensitive user interface, a method of selecting an entry using the touch sensitive user interface, comprising:

presenting, with one or more processors comprising instructions to implement the method, alphanumeric character ranges in a three-by-two matrix of touch sensitive keys on the touch sensitive user interface, wherein each alphanumeric character range is presented on a different touch sensitive key;

detecting, with the one or more processors, actuation of one of the touch sensitive keys;

presenting, with the one or more processors, alphanumeric characters on the touch sensitive keys, wherein each of the alphanumeric characters corresponds to both an alphanumeric character range presented on the one of the touch sensitive keys prior to actuation and at least one entry of a stored list of the address book application;

detecting actuation of another of the touch sensitive keys; and presenting, with the one or more processors, an alphanumeric character presented on the another of the touch sensitive keys in a search string indicator.

19. The method of claim 18, further comprising, upon presenting the alphanumeric character in the search string indicator, again presenting alphanumeric character ranges in the three-by-two matrix of touch sensitive keys.

* * * * *